United States Patent [19]

Nagai

[11] 4,258,407

[45] Mar. 24, 1981

[54] LIGHTNING ARRESTER DEVICE FOR POWER TRANSMISSION LINE

[75] Inventor: Nobuo Nagai, Amagasaki, Japan

[73] Assignee: Mitsubishi Denki Kabushiki Kaisha, Tokyo, Japan

[21] Appl. No.: 21,174

[22] Filed: Mar. 16, 1979

[30] Foreign Application Priority Data

Mar. 18, 1978 [JP] Japan .................................. 53-31462

[51] Int. Cl.3 ............................................... H02H 3/22

[52] U.S. Cl. .................................... 361/117; 174/144; 361/127

[58] Field of Search ......................... 361/117, 126-128; 74/139, 140 R, 144; 338/20, 21; 313/201, 203, 325

[56] References Cited

U.S. PATENT DOCUMENTS

| | | | |
|---|---|---|---|
| 3,806,765 | 4/1974 | Matsuoka et al. | 361/128 |
| 4,068,279 | 1/1978 | Byrnes | 361/56 |

FOREIGN PATENT DOCUMENTS

| | | | |
|---|---|---|---|
| 2259530 | 6/1973 | Fed. Rep. of Germany | 361/56 |
| 301509 | 10/1932 | Italy | 174/144 |
| 730710 | 5/1955 | United Kingdom | 361/127 |

*Primary Examiner*—Harry E. Moose, Jr.

*Attorney, Agent, or Firm*—Oblon, Fisher, Spivak, McClelland & Maier

[57] ABSTRACT

A lightning arrester device comprises a serial connection of a non-linear resistor and a linear resistor as a lightning arrester and a pair of electrodes disposed at both ends of the lightning arrester with a spark gap being defined between the electrodes thereby preventing a damage of the lightning arrester caused by direct lightning to a power transmission line.

5 Claims, 3 Drawing Figures

LIGHTNING ARRESTER DEVICE FOR POWER TRANSMISSION LINE

BACKGROUND OF THE INVENTION

The present invention relates to a lightning arrester device for power transmission line which is disposed on a steel tower for protection of an AC aerial power transmission cable.

In usual, a lightning arrester is disposed on a steel tower in order to protect an aerial power transmission cable from lightning. It is preferable to use a compact size of a lightning arrester, because of space problem.

A non-dynamic current type lightning arrester can be formed by using a sintered element having excellent non-linear resistive characteristic which is made of a main component of zinc oxide as a lightning arrester element, and a serial gapless compact lightning arrester can be obtained as disclosed in U.S. Pat. No. 3,806,765.

It has been considered that a zinc oxide type lightning arrester is optimum for protection of a power transmission line.

On the other hand, a shielding from lightning has been attained by using an aerial ground wire laid at a top of the steel tower in an aerial power transmission line system.

When the aerial ground wire is struck by lightning, a potential at the steel tower is instantaneously raised whereby a reverse flashover is applied to the power transmission cable in a case of no lightning arrester. When a lightning arrester is connected, the voltage applied to the supporting insulator for supporting the power transmission cable can be controlled to prevent the reverse flashover.

A lightning current passing through a lightning arrester is about 5 KA when a lightning having a peak value of 100 KA is struck to an aerial ground wire near the steel tower in two circuits of 275 KV.

In the case of the zinc oxide type lightning arrester, the lightning arrester is non-dynamic current type whereby it is enough to treat only the impulse current of about 5 KA and the duty for the operation is lower than the duty for the spark current of 10 KA as a lightning arrester for a substation. Therefore, if the lightning can be completely shielded by the aerial ground wire, only the duty of the lightning arrester is required. However, in practice, a failure of shielding is caused. For example, when the power transmission line is struck by the lightning of 100 KA near the steel tower, a lightning current of about 90 KA is passed through the lightning arrester in the phase of the cable on the steel tower. According to statistic data, in about 5% of lightnings, the lightning current of more than 100 KA is given.

In the conventional lightning arrester, about 90% of the direct lightning current should be arrested by the lightning arrester, whereby the operation duty is too heavy and sometimes, the lightning arrester is disadvantageously damaged.

SUMMARY OF THE INVENTION

It is an object of the present invention to overcome the abovementioned disadvantages.

It is another object of the present invention to provide a lightning arrester device for power transmission line which comprises a serial connection of a non-linear resistor and a linear resistor as a lightning arrester which is connected between a power transmission cable and a steel tower and a pair of electrodes disposed at both ends of the lightning arrester with a specific spark gap being defined between the electrodes whereby a lightning is treated by the lightning arrester when an operation duty is light as lightning to the aerial ground wire and an arcing is formed between the electrodes through the linear resistor by suddenly raising the voltage between both ends of the lightning arrester element to prevent damage of the lightning arrester.

DESCRIPTION OF THE PREFERRED EMBODIMENTS

Figure 1:
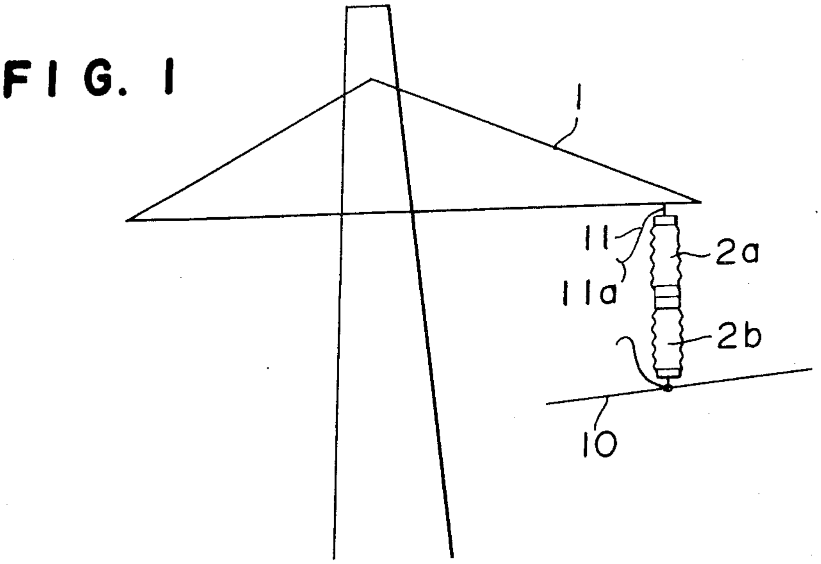
FIG. 1 shows a connection of lightning arrester device as one embodiment of the present invention.
Figure 2:
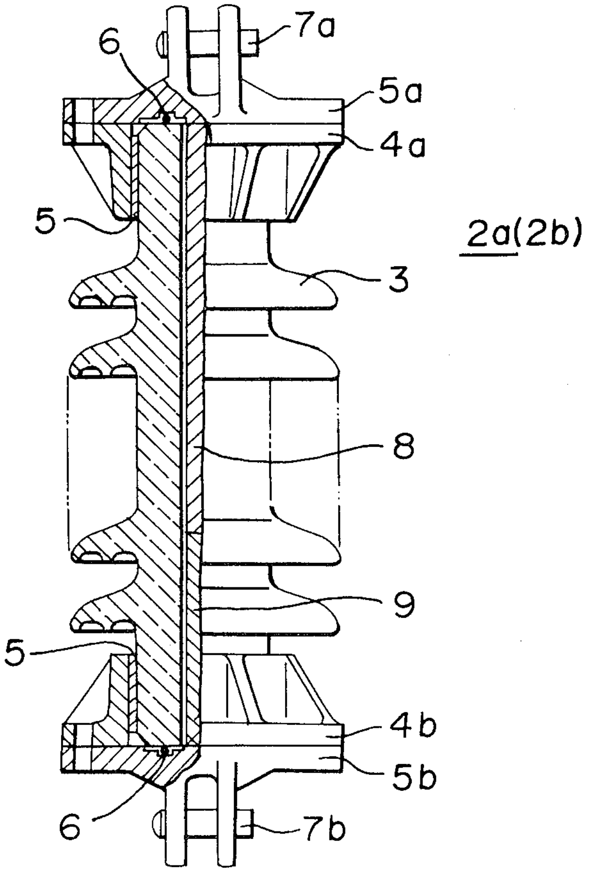
FIG. 2 is a partially enlarged sectional view of a lightning arrester used in the lightning arrester device of the present invention.

In FIG. 1, a power transmission cable (10) for one phase among the three phase transmission line is shown. The power transmission cable (10) is supported on a steel tower (1) by a two serial insulator lightning arresters (**2*a*), (2*b*). A pair of electrodes (11) are disposed at both ends of the lightning arresters (2*a*), (2*b*). A gap (11*a* ) is located between the ends of the electrodes (11). A lightning arrester device for power transmission line is formed by the pair of the electrodes (11) and the lightning arresters (2*a*), (2*b*). The lightning arresters (2*a*), (2*b*) are respectively formed by each hollow long insulator holding a lightning arrester element of a serial connection of a zinc oxide sintered type non-linear resistor and a linear resistor. The detail of the structure is shown in FIG. 2 wherein the reference numeral (3) designates a hollow long trunk insulator; (4*a*) and (4*b*) designate respectively flanges bonded on both ends of the insulator (3) with cement (5); (5*a*) and (5*b*) designate respectively terminals mounted on the flange (4*a*), (4*b*); (6) designates O-ring disposed between the insulator (3) and each terminal (5*a*), (5*b*) and the O-ring is used for shielding the non-linear resistor and the linear resistor; (7*a*), (7*b*) designate fitting bolts for fitting the lightning arrester on the steel tower (1) and the power transmission cable (10); (8) designates a nonlinear resistor made of zinc oxide sintered product as a part of the lightning arrester element which is held in the insulator (3) and is connected to the terminal (5*a*) at one end thereof; (9) designates a linear resistor as a part of the lightning arrester element which is held in the insulator (3) and is connected to the non-linear resistor (8) at one end and to the terminal (5*b***) at the other end.

A pair of the electrodes (11) shown in FIG. 1 are respectively mounted on the terminals (**5*a*), (5*b*) or the fitting bolts (7*a*), (7*b*) as the connecting parts of the terminals (5*a*), (5*b*) as shown in FIG. 2**.

In the embodiment of FIG. 2, the non-linear resistor (8) and the linear resistor (9) are held in one insulator (3). Thus, it is also possible that the non-linear resistor (8) and the linear resistor (9) are separately held in each different insulator and the two insulators are connected in series.

In the embodiment of FIG. 1, two insulator-lightning arresters (**2*a*), (2*b*) shown in FIG. 2 are connected in series to support the power transmission cable (10) on the steel tower (1**). Thus, it is also possible to support the power transmission cable (10) on the steel tower by one insulator-lightning arrester (2a) if the operation duty can be performed by only one insulator-lightning arrester. In the latter case, the pair of the electrodes (11) is connected at both ends of one lightning arrester (2a).

The operation of the lightning arrester device will be illustrated.

In the embodiment of FIG. 1, the aerial ground wire or the steel tower (1) is directly struck by lightning of 100 KA, and two circuit power transmission lines are supported on the steel tower (1), a current of about 5 KA is passed through lightning arresters (2a), (2b) in the upper phase. When the power transmission cable (10) near the steel tower (1) is directly struck by lightning of 100 KA because of failure of the shielding by the aerial ground wire, a current of 90 KA is passed through the nearest lightning arrester (2a), (2b).

Figure 3:
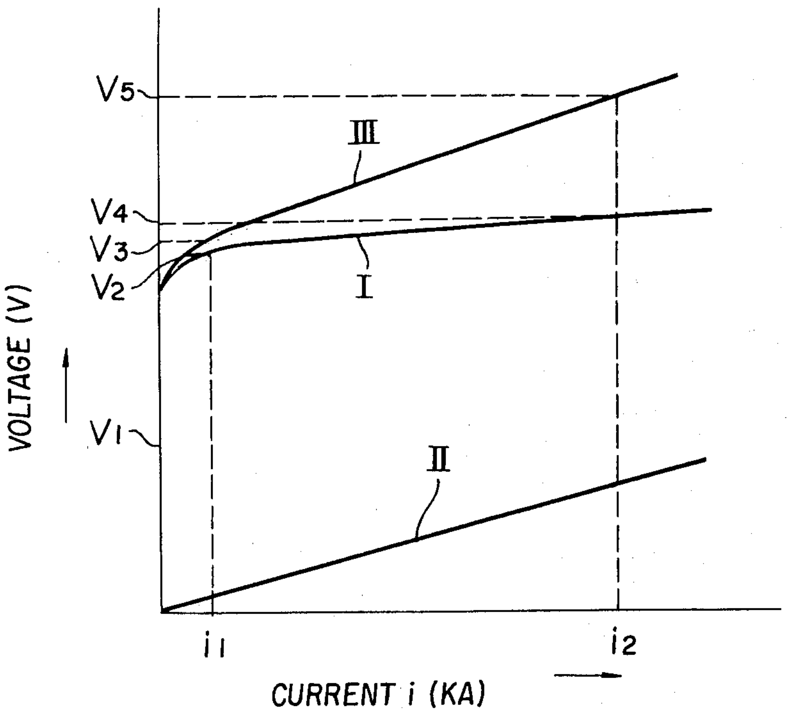
FIG. 3 shows characteristic curves for voltage-current characteristics of the lightning arrester device of the present invention.

When a current of 90 KA is passed through the lightning arresters (2a), (2b), the terminal voltage of the lightning arresters (2a), (2b) increase to $V_5$ as shown in FIG. 3 whereby grounding fault is caused by sparking in the gap (11a) between the electrodes (11). However, the lightning arresters (2a), (2b) need not treat such large energy and a damage of the lightning arresters can be prevented.

In FIG. 3, the characteristic curve (I) is the voltage-current characteristic curve of the conventional zinc oxide type lightning arrester and the characteristic curve (II) is the voltage-current characteristic curve of the linear resistor; the characteristic curve (III) is the voltage-current characteristic curve of the lighting arresters (2a), (2b) which is composite of the characteristic curve (I) and the characteristic curve (II). In FIG. 3, $V_1$ designates a normal voltage to ground; $V_2$ and $V_3$ designate respectively the terminal voltage of the non-linear resistor (8) and the terminal voltage of the lightning arresters (2a), (2b), when a current $i_1$ of about 5 to 10 KA is passed; and $V_4$ and $V_5$ designate respectively the terminal voltage of the non-linear resistor (8) and the terminal voltage of the lightning arresters (2a), (2b) when a current $i_2$ of about 90 KA is passed.

In FIG. 3, when the current $i_1$ of about 5 to 10 KA is passed by applying the normal voltage to ground $V_1$, the effect of the connection of the linear resistor (9) is negligible. However, when the large current $i_2$ of about 90 KA is passed, the terminal voltage is suddenly raised as the voltages $V_4$ and $V_5$ because of the effect of the linear resistor (9).

It is easy to set the condition that the spark is formed in the gap (11a) without failure when the voltage is raised to about $V_5$ whereas the spark is not formed in the gap when the voltage is raised to about $V_3$ under the condition of $V_3 << V_5$.

In accordance with the present invention, the lightning arrester comprising a serial connection of the non-linear resistor and the linear resistor is connected between the power transmission line and the steel tower and a pair of the electrodes are disposed at both ends of the lightning arrester with a spark gap being defined between the electrodes whereby the lightning is treated by the lightning arrester when the operation duty is light as the case of lightning to the aerial ground wire whereas the sparking is caused between the electrodes by utilizing the sudden increase of the voltage caused by the linear resistor at both ends of the lightning arrester when the operation duty is heavy as direct lightning to the power transmission line and the damage of the lightning arrester can be prevented. Moreover, the large current can be discharged through the gap between the electrodes whereby the lightning arrester can be a compact size because it can be for light operation duty.

What is claimed is:

1. A lightning arrester device for use with a power transmission line, comprising:
   - a lightning arrester including a linear resistor and a non-linear resistor connected in series; and
   - a pair of electrodes, one of said electrodes being disposed at each end of said lightning arrester, said electrodes forming a gap therebetween.

2. A lightning arrester device according to claim 1 wherein said non-linear resistor is made of a sintered product comprising a main component of zinc oxide sintered at high temperature.

3. A lightning arrester device according to claim 1 wherein said non-linear resistor and said linear resistor are held in an insulator.

4. A lightning arrester device according to claim 3 which further comprises:
   - a pair of terminals coupled to the ends of said serially connected linear and non-linear resistors, one of said terminals being located at each end of said insulator, one of said electrodes being coupled to each of said terminals.

5. A lightning arrester device according to claim 4 wherein said terminals located at both ends of said insulator are respectively connected to a steel tower and a power transmission cable.

* * * * *